(12) United States Patent
Ahn

(10) Patent No.: US 6,612,644 B2
(45) Date of Patent: Sep. 2, 2003

(54) FENDER FOR AUTOMOBILES

(75) Inventor: Byeong-Jik Ahn, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/085,231

(22) Filed: Feb. 26, 2002

(65) Prior Publication Data

US 2003/0015890 A1 Jan. 23, 2003

(30) Foreign Application Priority Data

Jul. 21, 2001 (KR) ........................................ 2001-44029

(51) Int. Cl.[7] ................................................ B60N 2/00
(52) U.S. Cl. ........................................ 296/189; 296/29
(58) Field of Search ................................ 296/188, 189, 296/194, 203.03, 29

(56) References Cited

U.S. PATENT DOCUMENTS

| | | | |
|---|---|---|---|
| 3,754,614 A | | 8/1973 | Habas |
| 4,186,476 A | | 2/1980 | Mair et al. |
| 4,359,120 A | * | 11/1982 | Schmidt et al. ......... 296/189 X |
| 5,269,583 A | | 12/1993 | Maeda |
| 5,358,302 A | | 10/1994 | Schoen et al. |
| 5,429,412 A | | 7/1995 | Schoen et al. |
| 5,466,035 A | * | 11/1995 | Klages et al. ............... 296/205 |
| 5,667,271 A | | 9/1997 | Booth |
| 2002/0060474 A1 | * | 5/2002 | Chung ....................... 296/189 |
| 2002/0063443 A1 | * | 5/2002 | Lee ............................ 296/198 |
| 2002/0171262 A1 | * | 11/2002 | Ozawa ....................... 296/189 |

FOREIGN PATENT DOCUMENTS

JP 60-259574 * 12/1985

* cited by examiner

Primary Examiner—Joseph D. Pape
(74) Attorney, Agent, or Firm—Pennie & Edmonds LLP

(57) ABSTRACT

A fender for automobiles is disclosed. This fender has a structure easily deformed when the head of a pedestrian collides against the fender in the case of collision of a moving automobile with the pedestrian, thus reducing impact applied from the fender to the head of the pedestrian and reducing damage to the pedestrian's head, and thereby meeting laws and regulations related to the safety of automobiles. The fender of this invention consists of a fender panel mounted at the inside flange thereof on the top wall of an inner apron panel of an apron unit, with a raised part provided on the inside flange of the fender panel at a predetermined portion. A damper is vertically mounted to the raised part of the inside flange and is inserted into the top wall of the inner apron panel. A deformable member, made of a deformable material, is provided on the top wall of the inner apron panel, with the damper inserted at the lower end thereof into both the deformable member and the inner apron panel.

7 Claims, 5 Drawing Sheets

FENDER FOR AUTOMOBILES

FIELD OF THE INVENTION

The present invention relates, in general, to a fender for automobiles and, more particularly, to a fender having a structure easily deformed when struck by a pedestrian, thus reducing force of impact applied from the fender to the pedestrian.

BACKGROUND OF THE INVENTION

As well known to those skilled in the art, the body of an automobile is fabricated by appropriately assembling a plurality of panels and frames to form a desired box-shaped appearance. Such a car body has been so called a monocaulk body in the field.

As shown in FIGS. 1 and 2, the front part of a car body has an engine compartment 10, in which a plurality of power train parts, such as an engine or a transmission, are installed. A wheel housing 12 is provided at each side of the engine compartment 10, while a fender 14 covers each side of the front part of the car body. An openable hood 16 covers the top of the engine compartment 10. Provided at the front end of the engine compartment 10 is a radiator mounting bracket 18. A cowl 20 extends between the two fenders 14 at the rear end of the engine compartment 10.

As shown in FIG. 3, each fender 14 is mounted at its inside edge to the top wall of an apron unit 22 having a box-shaped structure. The conventional fender 14 has a fender panel 14a, which is specifically bent at its inside edge and is mounted to the top wall of the apron unit 22 at the bent edge. In such a case, the inside edge of the fender panel 14a comes into surface contact with the top wall of the apron unit 22. The apron unit 22 comprises an outer apron panel 22a and an inner apron panel 22b, which are assembled together to form a desired box-shaped structure of the apron unit 22.

In a detailed description, the inside edge of the fender panel 14a is primarily bent downward to form a stepped vertical part 14b, and is secondarily bent horizontally to form an inside flange 14c. The stepped vertical part 14b and inside flange 14c of the fender panel 14a are positioned inside the engine compartment 10, and the inside flange 14c is screwed to the top wall of the inner apron panel 22b of the apron unit 22.

In recent years, laws and regulations related to the safety of automobiles require the manufacturers of automobiles to design the car bodies so as to reduce injuries to pedestrians in the case of collision of moving automobiles with pedestrians, in addition to protecting passengers in the case of collision. In order to inform consumers of the safety grades of a variety of automobile models, some countries establish official agencies for testing the safety of automobiles through an NCAP (New Car Assessment Program) including a front impact test, a side impact test, and a pedestrian test, and publicly announcing the test results. Examples of such agencies are FIA (Federation International Automotive) of France, IISH (Insurance Institute for Highway Safety) and NHTSA (National Highway Traffic Safety Administration) of USA. The pedestrian test of the NCAP is performed by making a moving automobile collide with a dummy, and measures damage to parts of the dummy to determine the pedestrian safety grade of the subject automobile. That is, in the pedestrian test of the NCAP, the agencies measure the expected damage to the head, neck, chest, pelvis and legs of a pedestrian through specified calculations, and express the safety grades of subject automobiles in star grades to classify the safety grades into "Good", "Acceptable", "Marginal" and "Poor". The safety grades of automobiles are announced to the public, thus allowing consumers to compare the automobiles in terms of safety grades when buying automobiles.

Typically, when a moving automobile collides with a pedestrian, the legs of the pedestrian primarily collide against the front part of the car body. Thereafter, the body of the pedestrian inertially slides upward along the hood 16 and the head of the pedestrian collides against a fender 14.

However, a typical conventional fender 14 as shown in FIGS. 2 and 3 generally does not meet the standard suggested by such an agency for protecting the head of a pedestrian. That is, the stepped vertical part 14b and the inside flange 14c of the fender panel 14a are formed in a linear shape which is not easily deformed when impact is applied to the fender 14. In addition, the space defined between the fender 14 and the apron unit 22 is not sufficient to allow effective deformation of the fender panel 14a. Therefore, the conventional fender 14 is inferior in the function of absorbing impact applied from the head of a pedestrian to the fender 14 in the case of a collision.

SUMMARY OF THE INVENTION

The present invention provides a fender for automobiles, which has a structure easily deformed when the head of a pedestrian collides against the fender in the case of collision of a moving automobile with the pedestrian, thus reducing impact applied from the fender to the head of the pedestrian and reducing injury to the pedestrian.

In a preferred embodiment, a fender panel is mounted at an inside flange of the fender on the top wall of an inner apron panel of an apron unit. The fender panel has a raised part provided on the inside flange at a predetermined portion, and a damper vertically mounted to the raised part of the inside flange and inserted into the top wall of the inner apron panel. Preferably, the fender of this invention, a deformable member made of a deformable material is provided on the top wall of the inner apron panel, with the damper being inserted at the lower end thereof into both the deformable member and the inner apron panel.

In an alternative embodiment of the invention a fender panel is supported by a support structure with deformable means interposed therebetween. Preferably the deformable means comprises a deformable support plate defining a hole with a tapered member received in the hole. The tapered member has a larger end and a smaller end. The larger end supports the fender panel and the smaller end is received in the hole. Impact force on the fender is transmitted to the tapered member such that the smaller end is driven into the deformable support plate to dissipate the impact force. The support structure may be an inner apron panel.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
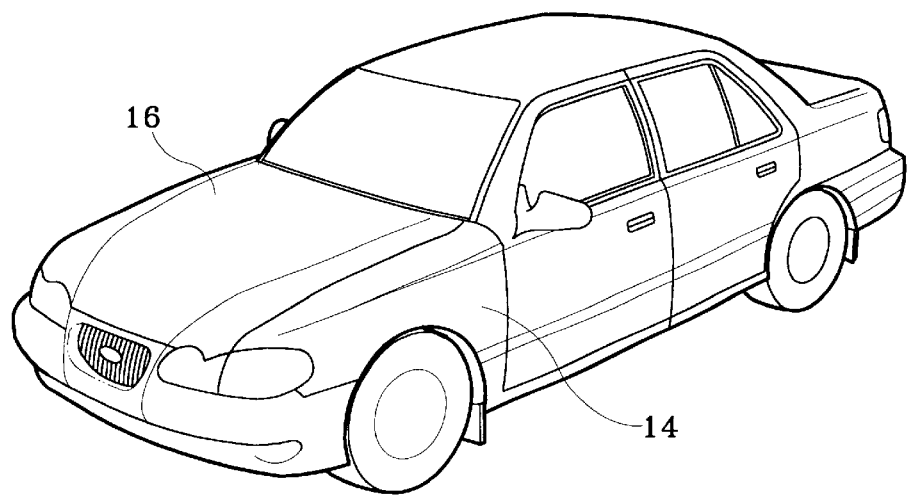
FIG. 1 is a front perspective view of the prior art showing an appearance of an automobile.
Figure 2:
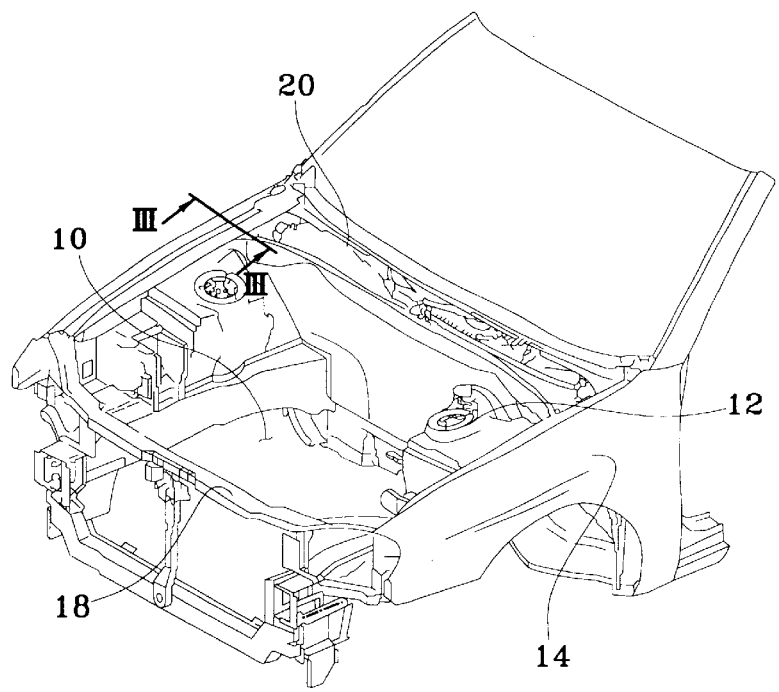
FIG. 2 is a perspective view of the prior art showing the front part of the body of the automobile of FIG. 1.
Figure 3:
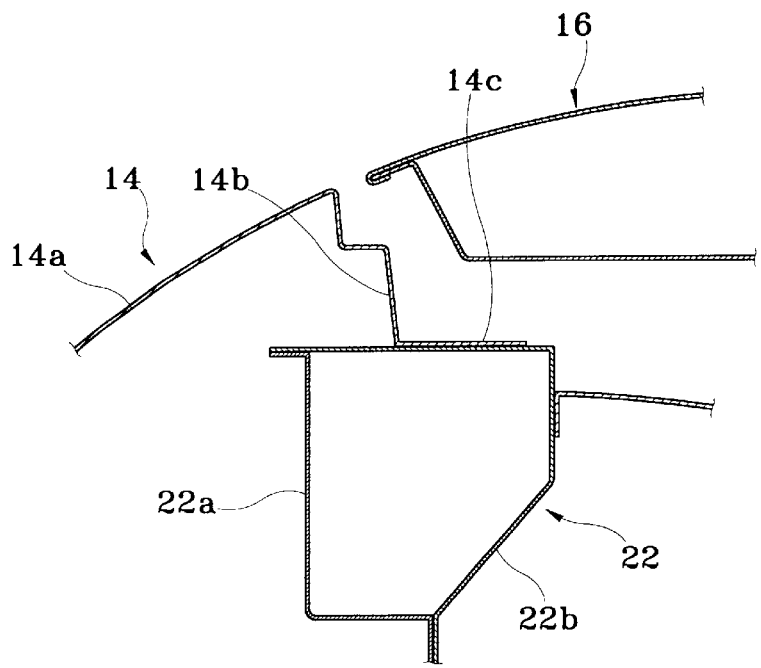
FIG. 3 is a sectional view of the prior art taken along the line III—III of FIG. 2, showing the fender of the body.

Reference now should be made to the drawings, in which the same reference numerals are used throughout the different drawings to designate the same or similar components.

Figure 4:
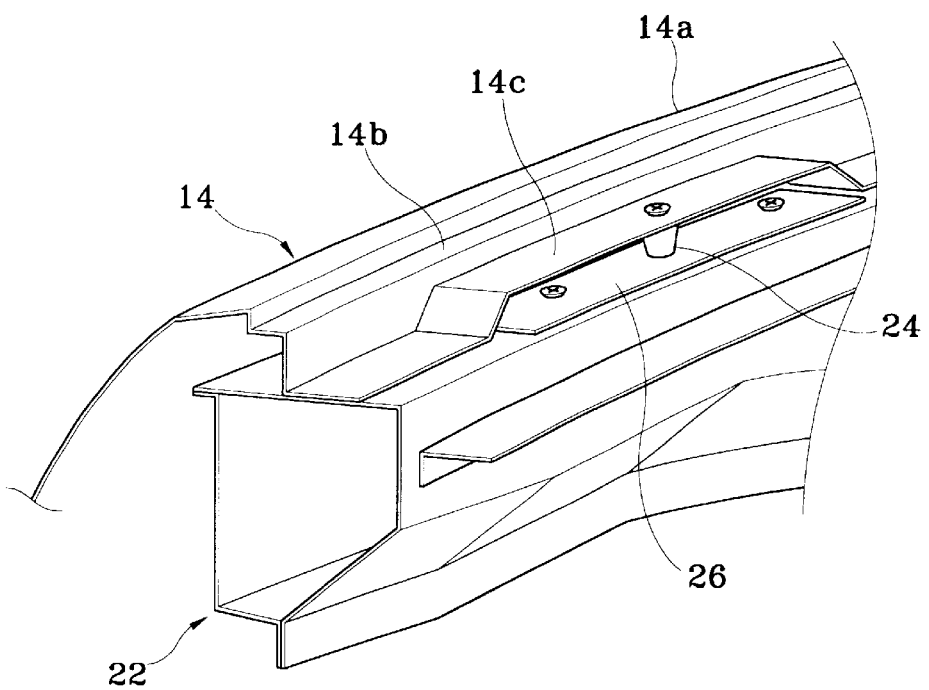
FIG. 4 is a perspective view of a fender for automobiles according to the preferred embodiment of this invention.
Figure 5:
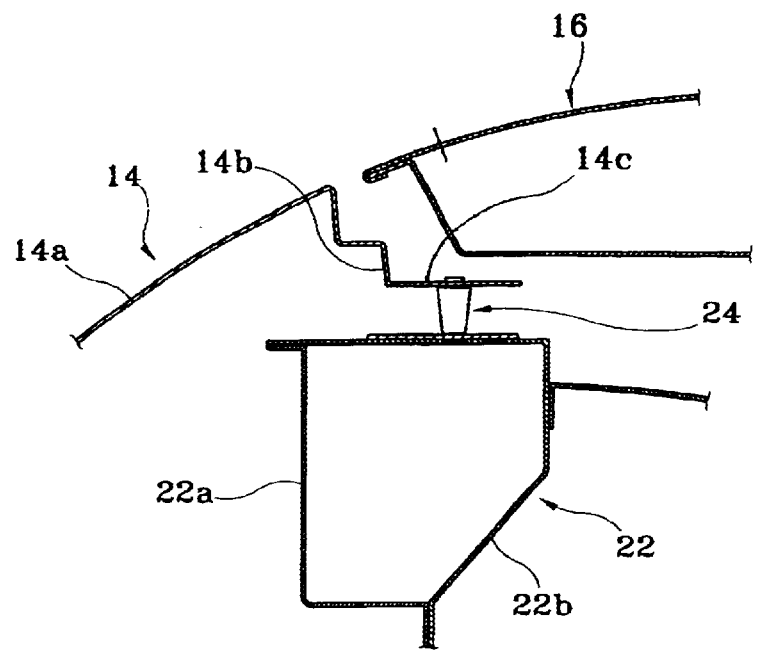
FIG. 5 is a sectional view, showing the position of a damper in the fender of FIG. 4.

As shown in FIGS. 4 and 5, the fender 14 for automobiles of this invention covers each side of the front part of a car body. The fender 14 consists of a fender panel 14a, the inside edge of which is bent toward an engine compartment 10, thus forming an inside flange 14c which is mounted to the top wall of the apron unit 22. Apron unit 22 thus forms a structural support for the fender. The inside flange 14c of the fender panel 14a is raised above apron unit 22 at a predetermined portion such that the fender panel 14a forms an easily deformed raised part when impact is applied to the panel 14a. A damper 24 is vertically mounted to the lower surface of inside flange 14c at the raised part using a bolt "B" such that the damper 24 is directed to the top wall of the apron unit 22.

A deformable member 26, made of a deformable material having a low strength, is attached on the top wall of the inner apron panel 22b of the apron unit 22 using a nut "N" and a bolt "B". The material of the deformable member 26 is selected such that the member 26 is easily deformed by impact applied from the damper 26.

Figure 6:
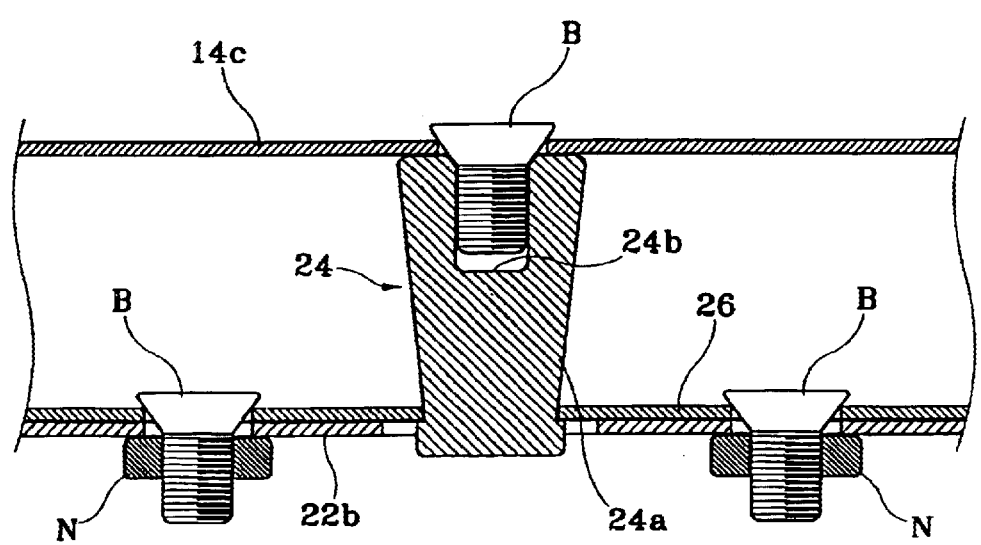
FIG. 6 is a sectional view, showing the construction of the inventive part of the fender around the damper of FIG. 5.
Figure 7:
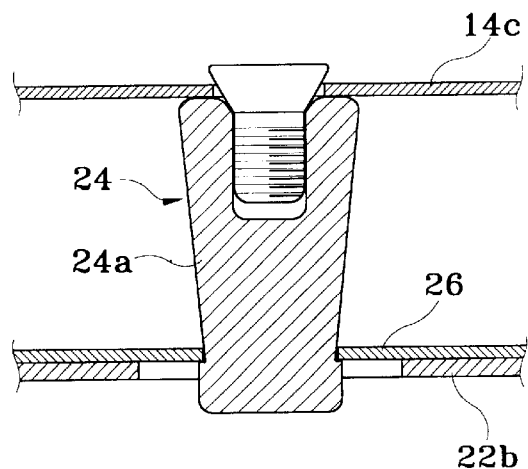
FIG. 7 is a sectional view, showing the steps of absorbing external shock by the damper of FIGS. 4 to 6 operated in conjunction with a deformable member when the fender of this invention is impacted.
Figure 7:
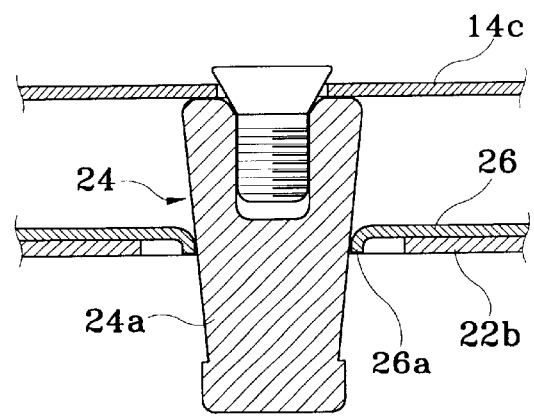
Figure 7:
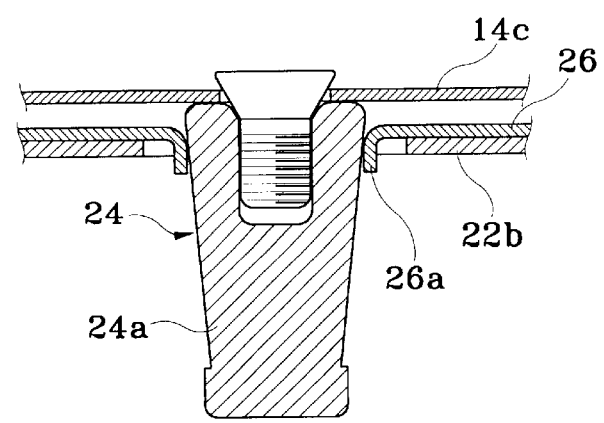

As shown in FIG. 6, the lower end of the damper 14 passes through a through hole 26a of the deformable member 26, and is inserted into the top wall of the inner apron panel 22b. The damper 24 is tapered in a direction from the upper end to the lower end thereof, thus having a tapered surface 24a. This damper 24 also has an axial hole 24b at the upper end to be mounted to the raised part of the inside flange 14c using the bolt "B". Due to such a tapered structure, the damper 24 has a large diameter at its upper end and a small diameter at its lower end. The damper 24 is mounted to the lower surface of the raised part at the large diameter upper end, and passes at its small diameter lower end through the through hole 26a of the deformable member 26 exteriorly mounted to the top wall of the inner apron panel 22b.

When the head of a pedestrian collides against the fender 14 in the case of collision of a moving automobile with the pedestrian, impact is applied from the pedestrian's head to the fender 14. The damper 24, mounted to the raised part of the inside flange 14c of the fender panel 14a, is thus forced to move down into the through hole 26a of the deformable member 26 while enlarging the hole 26a. Since the damper 24 moves downward while forcibly deforming the through hole 26a of the deformable member 26 when impact is applied from the pedestrian's head to the fender 14 during a collision of the pedestrian against the fender 14, the fender 14 effectively absorbs the impact.

In the present invention, it is possible to appropriately change the inclination angle of the damper's tapered surface 24a relative to the damper's axis, and to appropriately select the material of the deformable member 26, and to change the height that the raised part of the inside flange 14c is raised above apron unit 22 so as to minimize reaction force applied from the fender 14 to the head of a pedestrian.

The raised part at the inside flange 14c of the fender panel 14a, defines a desired space allowing easy and sufficient deformation of the fender panel 14 when impact is applied from the head of a pedestrian to the fender 14. In addition, both the damper 24, mounted to the raised part of the fender panel 14a, and the deformable member 26, mounted to the top wall of the inner apron panel 22b and movably supporting the lower end of the damper 14, secondarily absorb the impact applied from the pedestrian's head to the fender panel 14a through their deformations.

Figure 8:
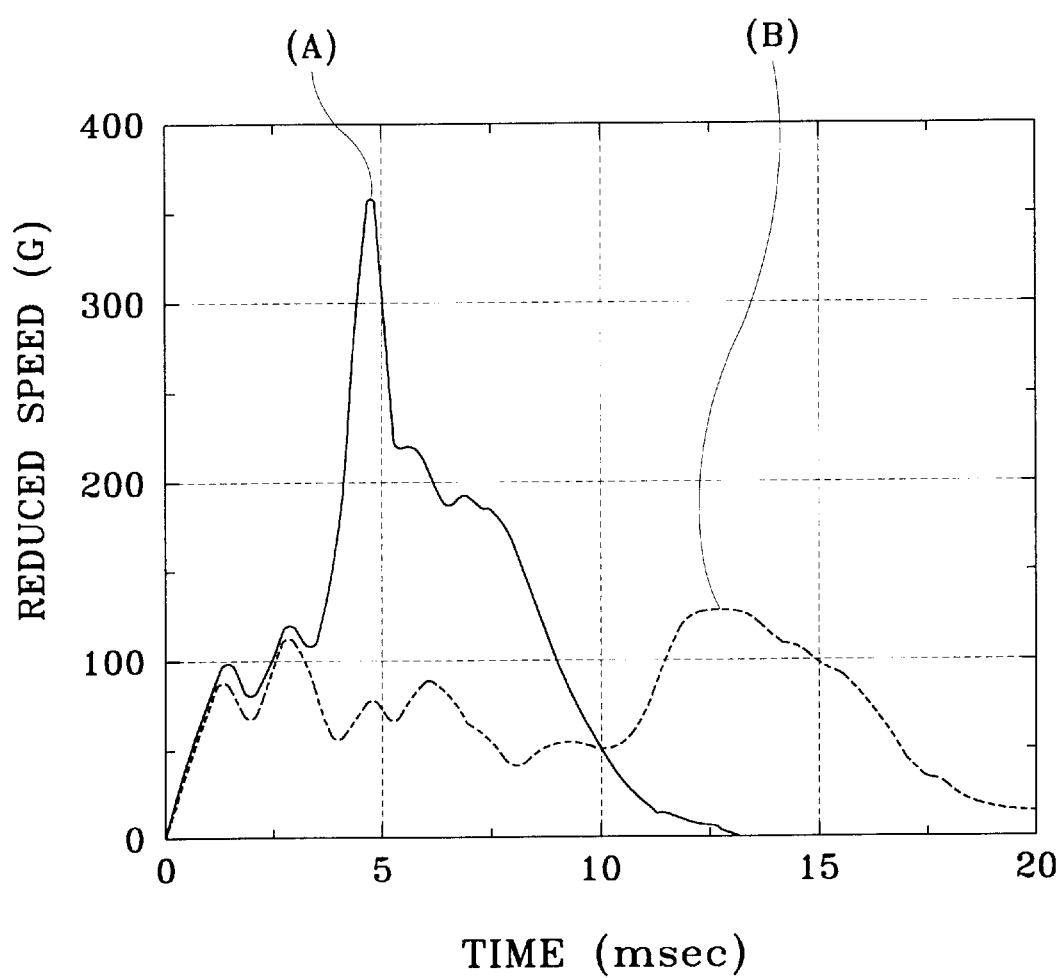
FIG. 8 is a graph showing deceleration as a function of time when the head of a dummy collides against the fender of this invention and a conventional fender in a pedestrian test of an NCAP.

FIG. 8 is a graph showing deceleration as a function of time when the head of a dummy collides against the fender of this invention and a conventional fender in a pedestrian test of the NCAP. As shown in the graph, the fender 14 of this invention is easily and sufficiently deformed by impact, and so the peak of the deceleration curve of this fender 14 is remarkably reduced as shown by the curve "A" in comparison with the conventional fender of the curve "B". It is thus apparent that the fender 14 of this invention desirably reduces reaction force applied to the head of a pedestrian in response to impact.

As described above, the present invention provides a fender for automobiles. This fender has a raised part at the inside flange of the fender panel, with a tapered damper mounted to the raised part such that the damper is inserted at its lower end into the top wall of the apron unit. A deformable member is attached to the top wall of the apron unit and has a through hole, which receives the lower end of the damper. When the head of a pedestrian collides against the fender in the case of collision of a moving automobile with the pedestrian, the deformable member is deformed by the damper and effectively absorbs impact applied from the head of the pedestrian to the fender.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fender for automobiles comprising:

a fender panel mounted at an inside flange thereof on a top wall of an inner apron panel of an apron unit, with a raised part provided on said inside flange of the fender panel at a predetermined portion; and a damper vertically mounted to said raised part of the inside flange and inserted into the top wall of said inner apron panel.

2. The fender according to claim 1, wherein a deformable member made of a deformable material is provided on the top wall of the inner apron panel, with the damper being inserted at a lower end thereof into both the deformable member and the inner apron panel.

3. The fender according to claim 1, wherein said damper is tapered in a direction from an upper end to a lower end thereof, thus having a tapered surface, and has an axial hole at the upper end to be mounted to the raised part of the inside flange.

4. The fender according to claim 2, wherein said deformable member has a through hole for receiving the lower end of said damper.

5. A fender for automobiles, comprising a fender panel supported by a support structure with deformable means interposed between said support structure and fender panel, wherein the deformable means comprises a deformable support plate defining a hole therethrough and a generally tapered member with larger and smaller ends, wherein the smaller end is received in said hole.

6. The fender according to claim 5, wherein:
said support plate is carried by the support structure; and
the fender panel is supported by the larger end of the tapered member such that impact force applied to the fender panel is transmitted to the tapered member, driving it into the deformable support plate.

7. The fender according to claim 5, wherein the support structure comprises an inner apron panel.

* * * * *